May 27, 1930. N. T. HAMMER ET AL 1,760,494
SANITARY CABINET
Filed July 31, 1929
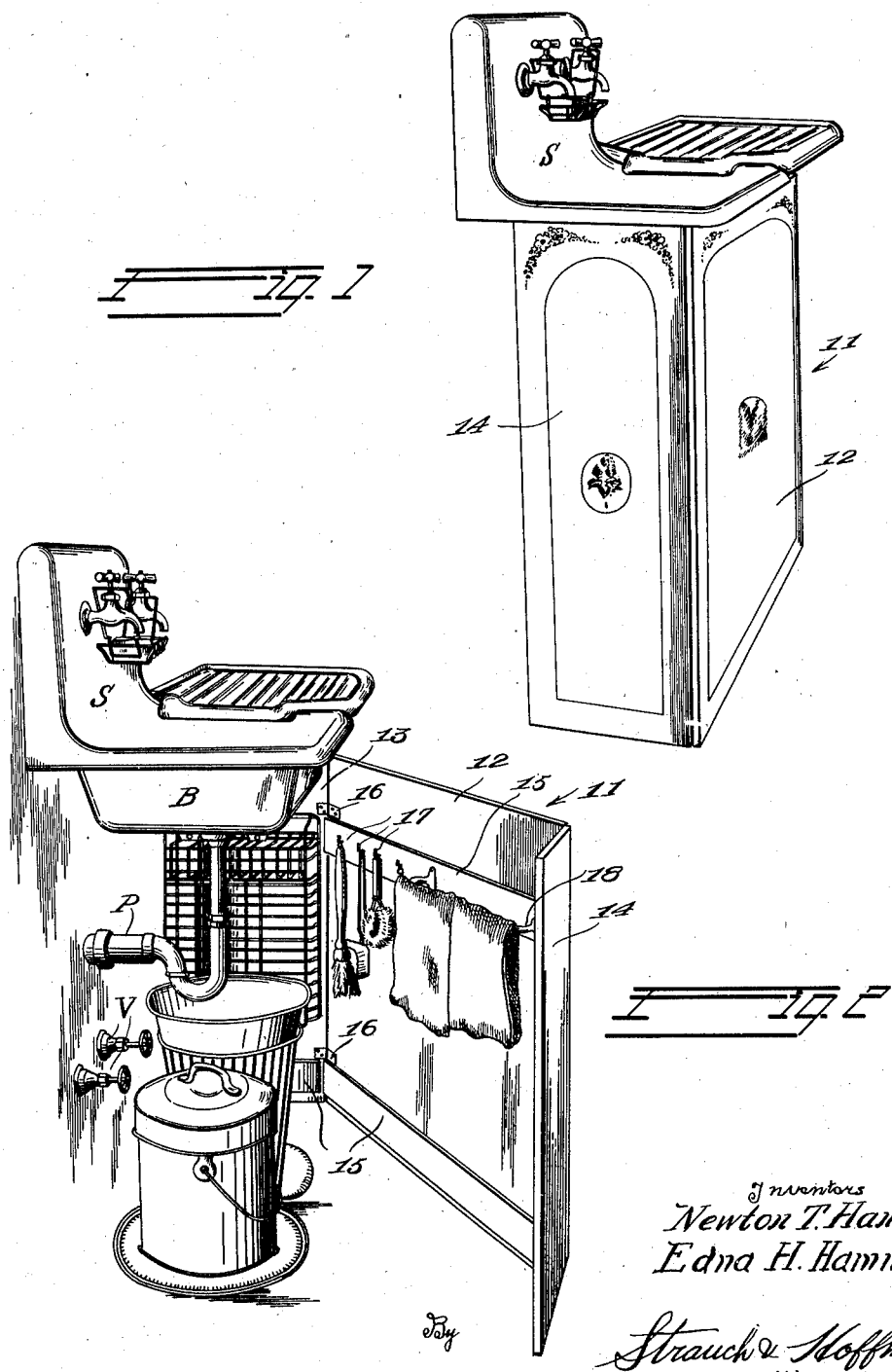

Patented May 27, 1930

1,760,494

UNITED STATES PATENT OFFICE

NEWTON T. HAMMER AND EDNA H. HAMMER, OF WASHINGTON, DISTRICT OF COLUMBIA

SANITARY CABINET

Application filed July 31, 1929. Serial No. 382,382.

The present invention relates to a sanitary cabinet for use with stationary wash stands, kitchen sinks and like modern sanitary plumbing structures.

More particularly, the invention relates to a removable member adapted for association with a projecting basin such as a sanitary kitchen sink ordinarily supported from a kitchen side wall for concealing the bowl portion thereof, the unsightly piping and valve structures, as well as garbage cans, waste paper baskets and other unsightly articles used about a kitchen, and further provides in combination with a sink and a portion of the wall, a convenient cabinet for the handy storage and concealment of useful additional household utensils and kitchen implements.

In the past it was the practice to build a cabinet under a kitchen sink, said cabinet being a permanent part of the wall and floor, the cabinet having shelving therein for receiving kitchen utensils.

As is well known, modern kitchens and kitchenettes, particularly in apartment houses, are comparatively small, thus necessitating the utilization of all available space. Sanitary kitchen sinks overhang a substantial space in the kitchen, and the necessary piping visible underneath, as well as the water flow controlling valves presents a rather unsightly appearance which is aggravated when unsightly kitchen utensils such as garbage cans, waste paper baskets, pans and the like are placed under the sink.

Due to the inevitable condensation of water on the pipes and the consequent drippings of water into the cabinet, such prior constructions have been generally abandoned as being unsanitary and replaced by modern sanitary plumbing fixtures. The modern kitchen therefore usually has a sink projecting into the kitchen with exposed pipings beneath the sink.

It is accordingly, a primary object of the present invention to provide a method of and a device for removable association with a basin or sink of the modern sanitary plumbing fixture type for concealing the bowl portion of the basin and the pipings, as well as to convert the space thereunder into a convenient storage cabinet space for housing utensils generally used with the basin or sink.

It is a further object of the invention to provide such a device which, although providing from external appearances a complete housing, yet may be readily disassociated entirely from the sink to expose completely the pipings and the floor and wall in back of the same to thereby clean such portion of the kitchen as well as remove the utensils kept thereunder, thereby providing a convenient storage and cabinet space without robbing the modern plumbing fixtures associated therewith of the sanitary advantages which led to their adoption and the elimination of the older types of built in fixtures.

It is a still further object of the invention to provide a cabinet for disposition beneath a sanitary kitchen sink for concealing the space thereunder and the pipes as well as providing in combination with the sink a sanitary cabinet for the concealed storage of various kitchen utensils and accessories.

It is a still further object of the invention to provide a collapsible device or cabinet embodying pivotally mounted sections for disposition beneath a kitchen sink for providing or giving an external appearance of a complete built-in cabinet concealing from view the under portion of the sink as well as the kitchen utensils disposed thereunder, the device further serving as a sanitary utility cabinet for the storage of various kitchen accessories which may be put into or removed from the cabinet upon opening or closing of one or the other of said pivoted sections.

With the above objects in view as well as others that will become apparent during the course of the following disclosure, reference will be had to the accompanying drawing forming part of same and wherein:

Fig. 1 is a perspective view of a kitchen sink disclosing the application thereto of the present invention in a preferred embodiment thereof.

Fig. 2 is a view similar to Fig. 1 disclosing the combined screen and cabinet construction in opened position.

Referring to the drawing by reference characters in which like characters designate like parts, and in which for the sake of clearness, numerals are employed for designating the different parts of the screen embodying the invention and letters are employed for designating parts not involved in the invention but with which the invention is adapted to cooperate. The numeral 11 designates the device in its entirety and which, in accordance with the present invention, comprises three sections 12, 13 and 14, the section 12 being disposed intermediate sections 13 and 14 as indicated in the drawings. The sections are constructed of relatively light material preferably soft wood, but may be constructed of any other suitable material. Each of the sections is reinforced to prevent warping thereof which is preferably accomplished by means of a batten 15 secured to each section adjacent both the upper and lower ends thereof, the upper battens 15 being spaced inwardly of the upper ends of the sections as indicated in Fig. 2, a sufficient distance to lie below the bowl portion B of the sink S in a closed position of the screen, while the lower battens 15 are disposed closely adjacent the lower ends of the sections. The sections 13 and 14 are hingedly connected to the intermediate section 12 by suitable hinges as indicated at 16 whereby the entire device 11 is collapsible or foldable for forming a three sided cabinet structure for enclosing the bottom portion of the sink as well as the space thereunder, as is clearly illustrated in Fig. 1.

The sections 12, 13 and 14 are provided on the inner surface thereof with suitable means for sustaining various household utensils which may comprise a plurality of hooks 17 which are preferably secured in the upper battens 15 on one or more of the sections for the suspension of various utensils required about the sink such as dish mop, pan scraper, bottle brushes, and like utensils. One of the sections, as for example section 12, may also be provided with a suitable rack 18 for supporting dish cloths and tea towels and one of the sections such as section 13, may be employed for the attachment of a dish draining rack. In fact, the inner surface of the sections 12, 13 and 14 may be provided with various forms of supporting and suspending means for the support and suspension of various implements used about the kitchen or sink.

The cabinet portion 11 embodying sections 12, 13 and 14 may be suitably finished on one or both sides thereof in any color or combination of harmonious colors, and decorated to suit the individual taste and to carry out the color scheme desired.

The construction above described is adapted for disposition about the sink B as indicated in Fig. 1 with the upper ends of the sections 12, 13 and 14 fitting about the front and opposite ends of the bowl portion B of sink S and with the sections together with the kitchen wall and with sink S providing a convenient cabinet rectangular in cross section, for the storage and concealment of various kitchen utensils and implements.

As will be seen upon reference to Fig. 2, the cabinet 11 encloses a substantial space beneath sink S in which space such utensils as waste basket, garbage can, etc., may be stored on the kitchen floor and which are entirely concealed as well as pipe P and valves V when the cabinet 11 is closed or folded about sink S as indicated in Fig. 1. The cabinet, while effectively serving to house and conceal the parts above described, further provides convenient means for the support of various kitchen implements which are also concealed by the screen 11.

Thus it will be seen that the cabinet entirely conceals the under portion of sink S as well as housing and concealing a relatively large number of the necessary utensils and implements required about a kitchen and the screen in applied position as indicated in Fig. 1 presents an attractive appearance to the sink, thus endowing the screen with a two-fold function of great utility, namely, providing a cabinet for the storage and concealment of various implements and utensils, and a decorative member for concealing the under-portion of the sink, water pipe, and valves.

By hinging sections 13 and 14 to section 12, access can readily be gained to the interior of the cabinet by swinging one or the other of sections 13 or 14 outwardly together with which section 12 may be swung outwardly as indicated in Fig. 2 for access to implements suspended on the inner face thereof, or utensils placed on the floor. The cabinet is relatively light and can easily be swung into open or closed position as indicated in Fig. 1.

A cabinet made up as above described has obvious advantages as regards sanitation, since the entire section 11 may be completely removed to allow thorough cleaning of the space under the sink. Also, since the cabinet is not permanently secured to the wall or to the floor, there are no concealed and inaccessible crevices in which water bugs or other insects may lodge.

The sections 12, 13 and 14 do not fit in airtight engagement with one another nor with the floor, wall or sink, and there is therefore a continual circulation of air in the cabinet to carry off any condensation of moisture on the pipes.

Although the invention has been described in connection with a kitchen sink, it will be obvious that it may be used in connection with the wash basins in bath rooms, or with the wash tubs in cellars, or elsewhere.

It will be understood of course, that the cabinet 11 may be constructed of various dimensions for accurate association with basins or sinks of different dimensions and which are in various spaced distances from the kitchen floor.

While we have disclosed but a single specific embodiment of our invention, same is to be considered as illustrative only and not restrictive, since the scope of the invention is defined by the subjoined claim rather than by the foregoing specific disclosure.

What we claim and desire to secure by United States Letters Patent is:

In combination with a sanitary kitchen sink projecting from a wall above the floor and having exposed pipes beneath the same, a readily removable cabinet comprising a front panel and two end panels hingedly connected thereto along adjacent edges, said panels being of a height to removably fit beneath the overhanging flange of said sink, and said end panels being of a width approximately equal to the distance the sink projects outwardly from the wall, and a rack on the rear of said cabinet for the support of utensils, whereby a readily removable cabinet is provided beneath said sink.

In testimony whereof I affix my signature.
NEWTON T. HAMMER.

In testimony whereof I affix my signature.
EDNA H. HAMMER.